United States Patent [19]

Sigel

[11] Patent Number: 5,674,030
[45] Date of Patent: Oct. 7, 1997

[54] DEVICE AND METHOD FOR REPAIRING BUILDING BRANCH LINES IN INACESSIBLE SEWER MAINS

[75] Inventor: Alwin Sigel, Nussberg, Switzerland

[73] Assignee: Sika Equipment AG., Widen, Switzerland

[21] Appl. No.: 339,305

[22] Filed: Nov. 14, 1994

Related U.S. Application Data

[63] Continuation-in-part of Ser. No. 39,445, Apr. 23, 1993, abandoned.

[30] Foreign Application Priority Data

Aug. 27, 1991 [CH] Switzerland ............ 02 507/91

[51] Int. Cl.⁶ .................... F16L 55/18; F16L 1/00
[52] U.S. Cl. ................ 405/154; 138/97; 405/156; 405/303
[58] Field of Search .................... 405/154, 303, 405/146, 184; 138/97; 156/287, 294

[56] References Cited

U.S. PATENT DOCUMENTS

| | | | |
|---|---|---|---|
| 1,906,416 | 5/1933 | Reed | 166/55.7 |
| 3,160,425 | 12/1964 | Sinnott. | |
| 4,728,223 | 3/1988 | Rice | 405/154 |
| 4,773,450 | 9/1988 | Stanley | 156/287 |
| 4,964,474 | 10/1990 | Poesch | 405/154 X |
| 5,049,003 | 9/1991 | Barton | 405/303 |
| 5,150,989 | 9/1992 | Long et al. | 405/303 |
| 5,211,509 | 5/1993 | Roessler | 405/154 X |
| 5,213,727 | 5/1993 | Gargiulo | 156/294 X |
| 5,356,502 | 10/1994 | Kamiyama et al. | 156/294 X |

FOREIGN PATENT DOCUMENTS

| | | |
|---|---|---|
| 3603597 | 8/1987 | Germany. |
| 370315 | 3/1989 | Germany. |
| 3803274 | 8/1989 | Germany. |
| 2213230 | 8/1989 | United Kingdom. |
| 2218490 | 12/1989 | United Kingdom. |
| 8603818 | 7/1986 | WIPO. |

*Primary Examiner*—Dennis L. Taylor
*Attorney, Agent, or Firm*—Anderson Kill & Olick P.C.

[57] ABSTRACT

The invention involves a device and a process which can be employed for sealing building branch lines (3b) leading from a building or a collecting manhole directly to a sewer main (4) using a relining process in which liners (1) made of self-hardening/self-curing sealant are used. In the process according to the invention, a pipe repairing machine (6) is employed which features a rope guiding device (10) at its front end (14), said rope guiding device (10) being comprised of a roller mount (15) to which a deflection pulley (5) and a retaining roller (16) are affixed. The pipe repairing machine (6) into whose rope guiding device (10) the rope (7) to which the liner (1) is attached is threaded is positioned inside the sewer main (4) at the building branch line junction (2) in such a manner that the rope (7) does not come into contact with the building branch line edge (9) facing the pipe repairing machine (6) when taut. While the rope (7) is being pulled through the building branch line (3b), a support foot (11) with a brake block (12) ensures that the pipe repairing machine (6) does not shift.

7 Claims, 2 Drawing Sheets

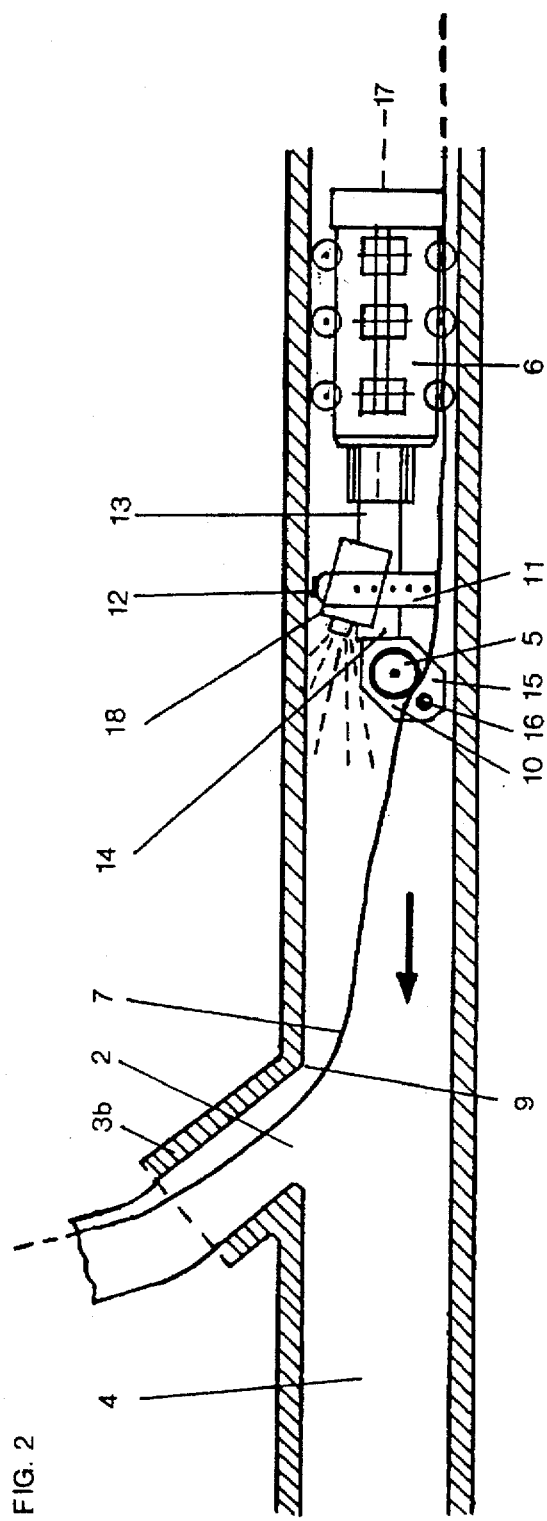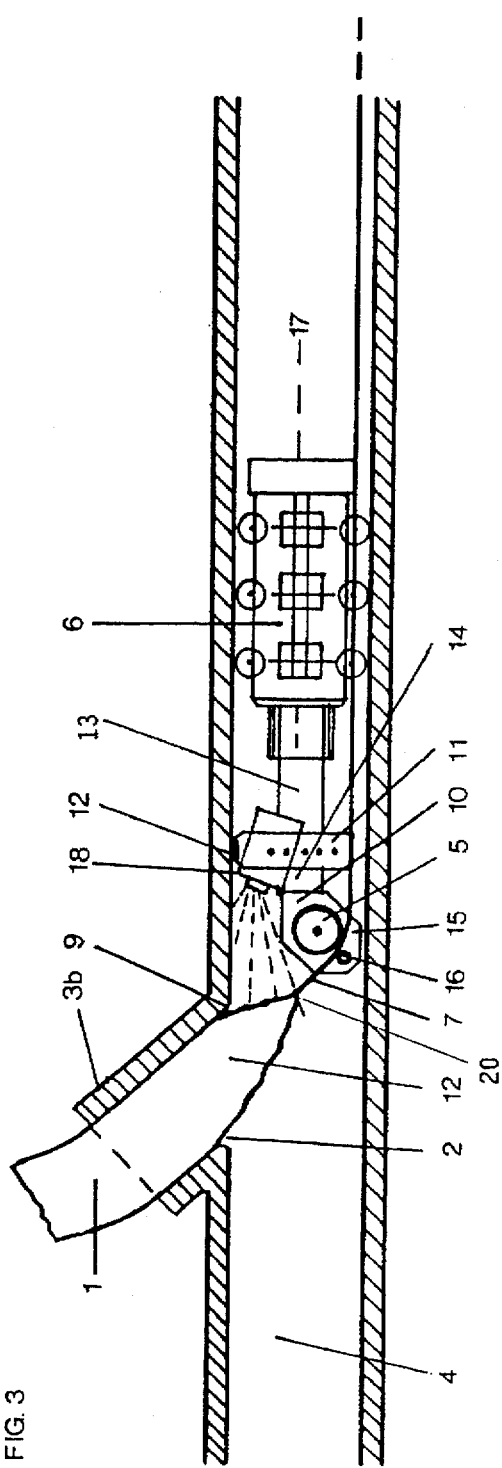

DEVICE AND METHOD FOR REPAIRING BUILDING BRANCH LINES IN INACESSIBLE SEWER MAINS

This is a continuation-in-part of application Ser. No. 08/039,445, filed Apr. 23, 1993, now abandoned.

BACKGROUND OF THE INVENTION

Conduits which conduct waste water from buildings either empty directly into a sewer main (4) (cf. FIG. 1) which is located underneath a street passing by the building or lead first to a collecting manhole (8a) connecting the building branch line to the sewer main (4). Conduits leading to the sewer main (4) can either empty directly into the sewer main pipe (4) or into a collecting manhole (8b) upstream of the sewer main (4). Conduits leading directly or indirectly from buildings to the sewer main are called building branch lines. For the most part, the diameter of both of these types of building branch lines (3a), (3b) as well as the sewer main (4) is rather small, thus rendering them inaccessible. In order to prevent the street from having to be blocked off and dug up when the sewer system requires repairing, repair techniques are sought which do not require the sewer system to be dug up, e.g. remote-controlled robots etc. Units of this type have been successfully employed particularly in sewer main (4) with a sufficiently large diameter for quite some time now. Standard-size robots are generally too large for performing repair work in building branch lines (3a), (3b). Other devices and methods have to be employed here.

One of the methods employs thin-walled, soft, moldable conduits made of self-curing sealant, so-called liners. Such liners can be made of felt or felt-fiber glass blends soaked in epoxy resin or other materials. The hollow area of this moldable conduit features an inflatable tube made of rubber-like material. In this process, a thin cord is flushed through from the drain inside the building (19) through the building branch line (3a) to the collecting manhole (8a). Once the cord can be picked up in the collecting manhole (8a) a rope is tied to the other end of it inside the building, followed by the rope being pulled through the building branch line (3a) via the cord to the collecting manhole (8a). The soft, moldable conduit, the so-called inliner, is attached to the upper end of the rope inside the building by tying the front end of the inliner together so that it forms a pointed tip. This is followed by pulling the liner by the rope through the building branch line (3a) up to the collecting manhole (8a). The tube inside the liner is now inflated. As a consequence, the soft, moldable conduit is enlarged, in the process being pressed against the old, defective conduit wall and thus forming a perfect fit with it. The tube remains inflated for approximately 12 hours, e.g. overnight. During this time the sealant hardens/cures in the shape of the soft conduit of the liner. When curing is complete, the air compressor used to inflate the rubber tubing can be switched off. The originally soft conduit is now hardened/cured, in addition to being water-tight and exhibiting considerable strength. The tip of the liner projecting into the collecting manhole (8a) is then cut off flush with the manhole wall and the deflated rubber tubing is pulled out of the repaired building branch line (3a).

The above-described relining method is excellent for repairing lines (3a) leading between a drain (19) located inside a building and a collecting manhole (8a) as in the case described above or for repairing lines (3a) connecting two collecting manholes (8a), (8b) with one another; however, it is not suitable for repairing lines (3b) which empty directly in a sewer main pipe (4). Owing to the fact that both the building branch line (3b) and the sewer main (4) are inaccessible, the rope to which the liner is attached has to be pulled through the building branch line (3b) to the junction with the sewer main (4) and from there through the sewer main (4) to the next collecting manhole (8b). The other end of the rope cannot be picked up until reaching the collecting manhole (8b). This means, however, that the rope has to be pulled over the edge (9) of the junction (2) of the building branch line (3b). When the rope is pulled from the collecting manhole (8b), it slides over this sharp edge (9), in the process being damaged so that it rips or cannot be pulled beyond this edge (9) due to the friction created. The present state of the art does not provide for a suitable device or process for repairing building branch lines (3b) which empty directly into a sewer main pipe (4). To date, such building branch lines (3b) have had to be dug up for repair work, which has proven quite costly.

The intention behind the invention at hand was to develop a device and process which can be used to repair building branch lines (3b) emptying directly into a sewer main pipe (4) in an easy, economical and environmentally safe manner.

SUMMARY OF THE INVENTION

The object of the invention is achieved by the insertion of a pipe repairing machine, which has a rope guiding device mounted thereon, into the sewer main, threading a liner carrying rope in the rope guiding device and, thereafter, positioning the pipe repair machine at the junction of the building branch line with the main, and pulling the rope through the rope guiding device for placing the liner at the junction of the branch line with the main.

In the method according to the invention, the rope (7) (cf. FIGS. 2 and 3) to which the liner (1) is attached is guided via a deflection pulley (5) mounted to a remote-controlled pipe repairing machine (6) into the sewer main (4) at the junction (2) of the building branch line (3b) in such a manner that it does not come into contact with the edge (9) of the building branch line (3b) formed with the collecting manhole (8b).

BRIEF DESCRIPTION OF THE DRAWINGS

Description of the enclosed figures:

FIG. 2 Side view of a cut-open sewer main (4) in which a remote-controlled pipe repairing machine (6) is positioned which is approaching the building branch line (2) and whose deflection pulley (5) carries an liner rope (7).

FIG. 3 Side view of a cut-open sewer main (4) in which a remote-controlled pipe repairing machine (6) featuring a deflection pulley (5) is positioned at the junction (2) of the building branch line (3b) in such a manner that the liner rope (7) does not come into contact with the edge (9) formed with the building branch line (3b).

BRIEF DESCRIPTION OF THE PREFERRED EMBODIMENT

Figure 1:
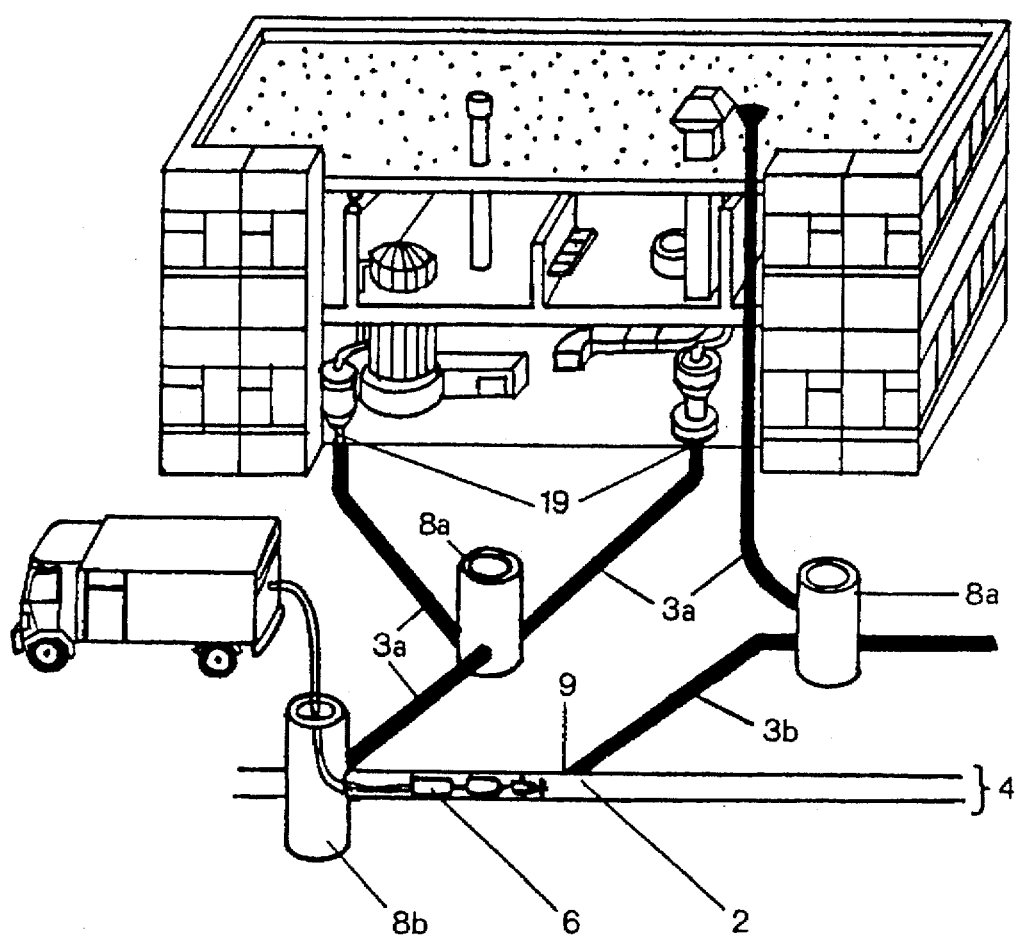
FIG. 1 Schematic drawing of a sewer system with various configurations of collecting manholes (8a), (8b), building branch lines (3a), (3b) and a sewer main (4).

The machine (6) used for performing the proposed process is a remote-controlled pipe repairing machine of the type as used for pipe repair to date, which, however, is additionally fitted with the equipment required for the process. The supplementary equipment consists of a rope guiding device (10) mounted to the front end (14) of the pipe repairing machine (6) and of a support foot (11) which is mounted to a cylindrical shaft (13) bearing the front end (14). The rope guiding device (10) comprises a roller mount (15) which is fitted with a deflection pulley (5) and a retaining roller (16). The pivot axles of the deflection pulley (5) and the retaining roller (16) are affixed to the roller mount (15) in such a manner that they are positioned vertical to the lengthwise axis (17) of the pipe repairing machine (6). The support foot (11) is mounted to the cylindrical shaft (13) in a movable manner so that it is positioned vertical to the lengthwise axis (17) of the pipe repairing machine (6) and can be radially slid forwards and backwards towards the outside and inside in accordance with the diameter of the sewer main (4). It can be locked in various forward feed positions. It bears a brake block (12) on its outer face. The pipe repairing machine (6) is additionally equipped with a video camera (18) which is also mounted to the shaft (13) and whose lens coverage area is directed towards the front so that the position of the deflection pulley (5) in relation to the junction (2) of the building branch line (3b) can be picked up.

The shaft (13) can be motor-rotated about its lengthwise axis.

The process according to the invention is performed as follows:

In the first step the junction (2) of the building branch line (3b) has to be prepared. The edges of the joining pipes often project into the hollow area of the sewer main (4) (especially in the case of old building branch lines (3b)). These edges are milled off by a repair unit fitted with a cutting-off wheel. Despite this pretreatment, the edges of the pipes remain so rough and sharp that they could damage the rope (7) to which the liner (1) is attached.

Then a cord is flushed through the building branch line (3b) up to the junction (2) into the sewer main (4) and from there through the sewer main (4) to the next collecting manhole (8b).

This is followed by a rope (7) being pulled through the building branch line (3b) and the sewer main (4) to the collecting manhole (8b) of the sewer main (4) with the aid of the cord previously flushed through. The rope of the inliner (1) is tied to the end of the rope located inside the building or inside the collecting manhole (8a) upstream of the sewer main (4).

A pipe repairing machine (6) corresponding to the above description is inserted into the sewer main (4) at the collecting manhole (8b) of the sewer main (4) and the flushed-through rope (7) is threaded between the deflection pulley (5) and the retaining roller (16) forming a rope guiding device (10). The retaining roller (16) prevents the rope (7) from slipping out of the rope guiding device (10) by tautening the rope against the deflection roller (5), as shown in FIG. 3, to prevent the rope dislodging therefrom.

Upon completion of the above preparation work, the pipe repairing machine (6) is moved forwards in the direction of the building branch line junction (2). In the process, the rope guiding device (10) slides along the rope (7). Via the video camera (18), whose signals are transmitted by way of supply lines to the collecting manhole (8b), it can be determined when the deflection pulley (5) has attained its proper position alongside of sewer mains (4) via which the rope (7) is stretched and conducted past the edge (9) of the building branch line (3b) formed with the collecting manhole (8b) of the sewer main (4) without coming into contact with this edge.

Once it has attained this position, the pitch of the deflection pulley (5) can be optimally adjusted by rotating the shaft (13). This is followed by the forward feed position of the support foot (11) being adapted to the diameter of the sewer mains (4). Then the rope (7) is pulled in from the collecting manhole (8b) of the sewer mains (4). In the process, the as yet soft liner (1) is pulled through the building branch line (3b) in the direction of the sewer mains (4). By virtue of the tension applied to the rope (7), the rope guiding device (10) and, as a consequence, the entire pipe repairing machine (6) are pressed against the wall of the sewer mains (4). The support foot (11) along with the brake block (12) now prevent the pipe repairing machine (6) from consequently shifting. The brake block (12) is pressed against the pipe wall, thus preventing the pipe repairing machine (6) from sliding.

The liner (1) is pulled in the direction of the sewer mains (4) until its front tip (20) projects into the sewer mains (4). The pipe repairing machine (6) can then be moved out of the sewer mains (4) back into the collecting manhole (8b) and the rope (7) can be disengaged from the rope guiding device (10). This is followed by inflating the rubber tube inside the liner (1) using a pump or air compressor located inside the building or in the collecting manhole (8a) upstream of the sewer mains (4), with the liner (1) being pressed against the wall of the building branch line (3b) in the process. The rubber tube remains under pressure for approximately twelve hours, e.g. overnight. During this time, the liner (1) hardens/cures.

Upon completion of hardening/curing, the pressure inside the tubing is released. The front tip (20) of the liner (1) is milled off by the pipe repairing machine, which has been fitted with a cutting-off wheel in the meantime, and pulled out of the sewer mains (4) via the rope (7). The rope and the deflated rubber tubing inside the liner (1) can now be pulled out of the building branch line (3b).

Thanks to the new process and the new device, building branch lines (3b) leading from a drain (19) inside a building or from a collecting manhole (8a) located upstream of the sewer mains (4) directly into a sewer main (4) can be repaired with the aid of liners (1). That has not been possible up until now. The relining method using liners (1) is a fast, economical and environmentally safe method for repairing building branch lines (3b). Damaged building branch lines (3b) often lead to private homes. The home owner has to pay the repair costs himself in this case and is thus interested in an economical repair method. In addition, the pipe repairing machine (6) can be removed from the collecting manhole (8b) while the liner (1) is hardening/curing and the manhole covered so that traffic is not blocked during this time.

The new method and the new device enabling the general use of liners (1) in all cases will be of great interest owing to the advantages outlined above.

I claim:

1. An utility conduit system for a building comprising:
    a main;
    a branch line connecting the building with the main and opening directly into the main; and
    an apparatus for placing a liner, which is made of a self curing sealant, into the branch line;
    wherein said apparatus comprises:
        a pipe repairing machine to be located in the main, and
        a device mounted at an end of said pipe repairing machine for guiding a rope with which the liner is pulled into the branch line.

2. A system according to claim 1, wherein said rope guiding device comprises a roller mount supported at a free end of a shaft projecting from said pipe repairing machine; and a deflection pulley supported on said roller mount.

3. A system according to claim 1, wherein said apparatus comprises a brake block for abutting an inner wall of the main for retaining the pipe repairing machine in a predetermined position in the main; and a support foot for supporting said brake block on said pipe repairing machine.

4. A system according to claim 3, wherein said apparatus comprises means for adjusting a position of said foot support in accordance with a diameter of the main.

5. A system according to claim 1, further comprising a video camera mounted at a front end of the pipe repair machine.

6. A system according to claim 2, wherein said apparatus comprises a retaining roller for tautening the pulling rope against said deflection pulley.

7. A system according to claim 3, wherein said shaft is rotatable for adjusting a position of said foot mount.

* * * * *